United States Patent [19]

Bertelsen

[11] Patent Number: 4,778,019

[45] Date of Patent: Oct. 18, 1988

[54] DYNAMIC SEALS FOR VEHICLE AIR SUSPENSIONS

[76] Inventor: William R. Bertelsen, 2720 31st Ave., Rock Island, Ill. 61201

[21] Appl. No.: 97,447

[22] Filed: Sep. 16, 1987

[51] Int. Cl.$^4$ ............................................. B62D 55/247
[52] U.S. Cl. ........................................ 180/9.1; 305/16; 305/34
[58] Field of Search ...................... 180/9.1; 305/15, 16, 305/34, 35 R, 39; 152/589

[56] References Cited

U.S. PATENT DOCUMENTS

| | | | |
|---|---|---|---|
| 3,427,078 | 2/1969 | Parsons | 305/34 R |
| 4,283,094 | 8/1981 | Bertelsen | 305/16 |
| 4,530,545 | 7/1985 | Bertelsen | 305/16 |

Primary Examiner—John A. Pekar
Attorney, Agent, or Firm—James T. FitzGibbon

[57] ABSTRACT

A sealed, air-containing vehicle suspension assembly. The assembly includes an endless track unit trained over a pair of wheel units each supported by the end portion of an axle, a pair of side plates, and a pair of dynamic seal assemblies. The dynamic seal assemblies each include a diaphragm portion with its outer margin secured to outer margins of the track unit and its inner margin carried by support units extending inwardly from the track. The primary seal unit has a tubular cross section and its inner sidewall affixed to the inner diaphragm margin. A part of the primary seal outer sidewall has a smooth sidewall sealing surfaces which engages an inwardly facing surface of its associated end plate along a path generally parallel to the travel path of the track. The primary seal unit also includes spaced apart air inlet openings between its sidewall sealing surface and the inner margin along which it is joined to the diaphragm, whereby the air within the support seal assembly may enter the primary seal unit to maintain an inflation and sealing pressure.

8 Claims, 3 Drawing Sheets

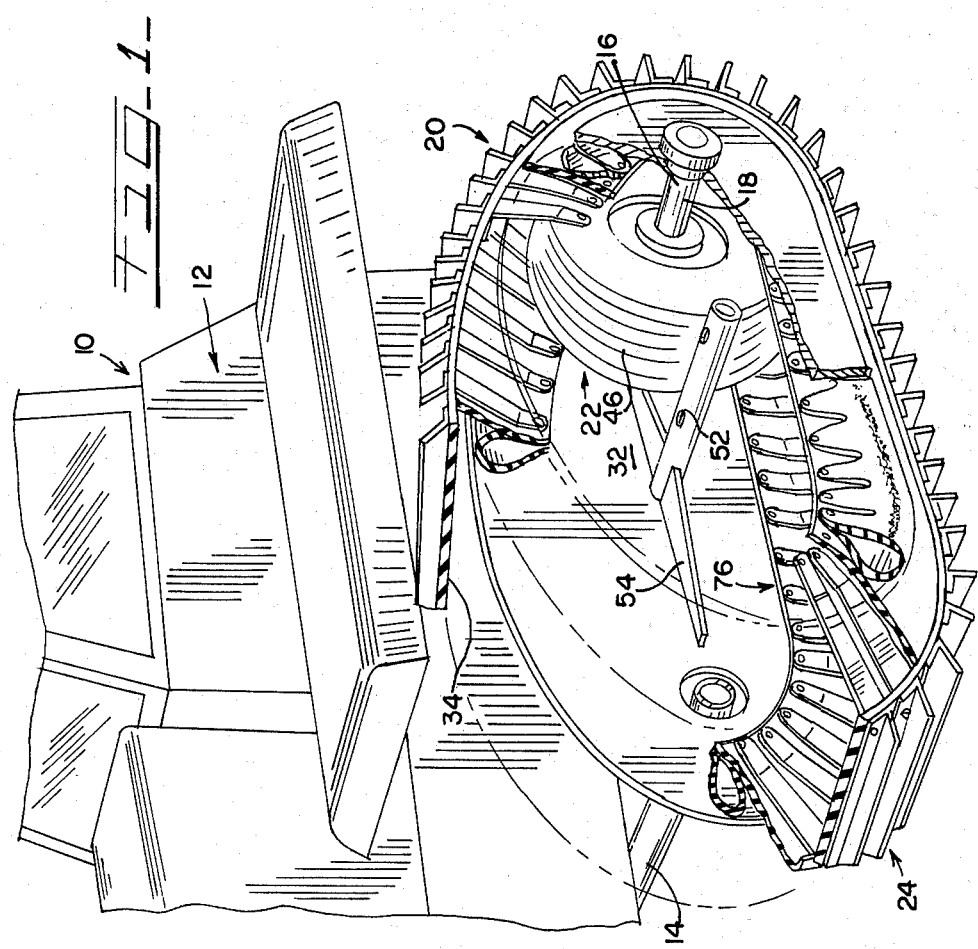
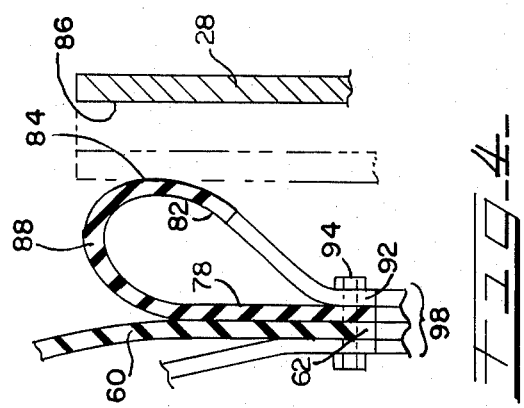

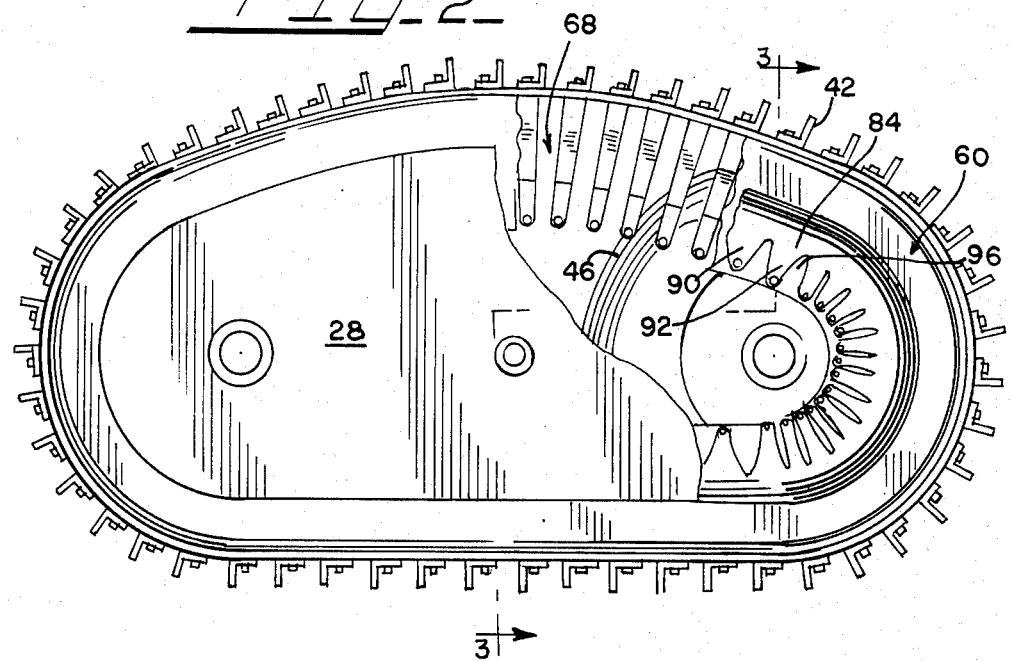
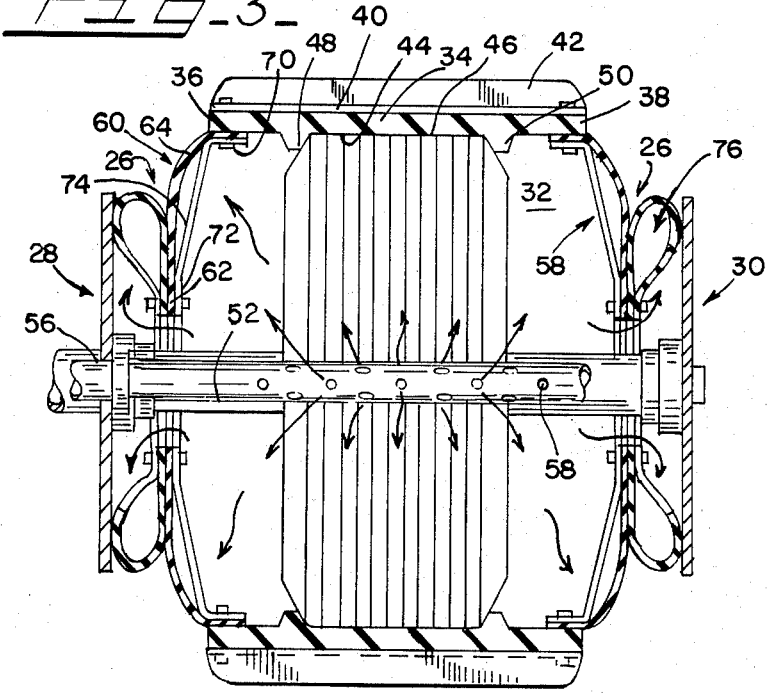

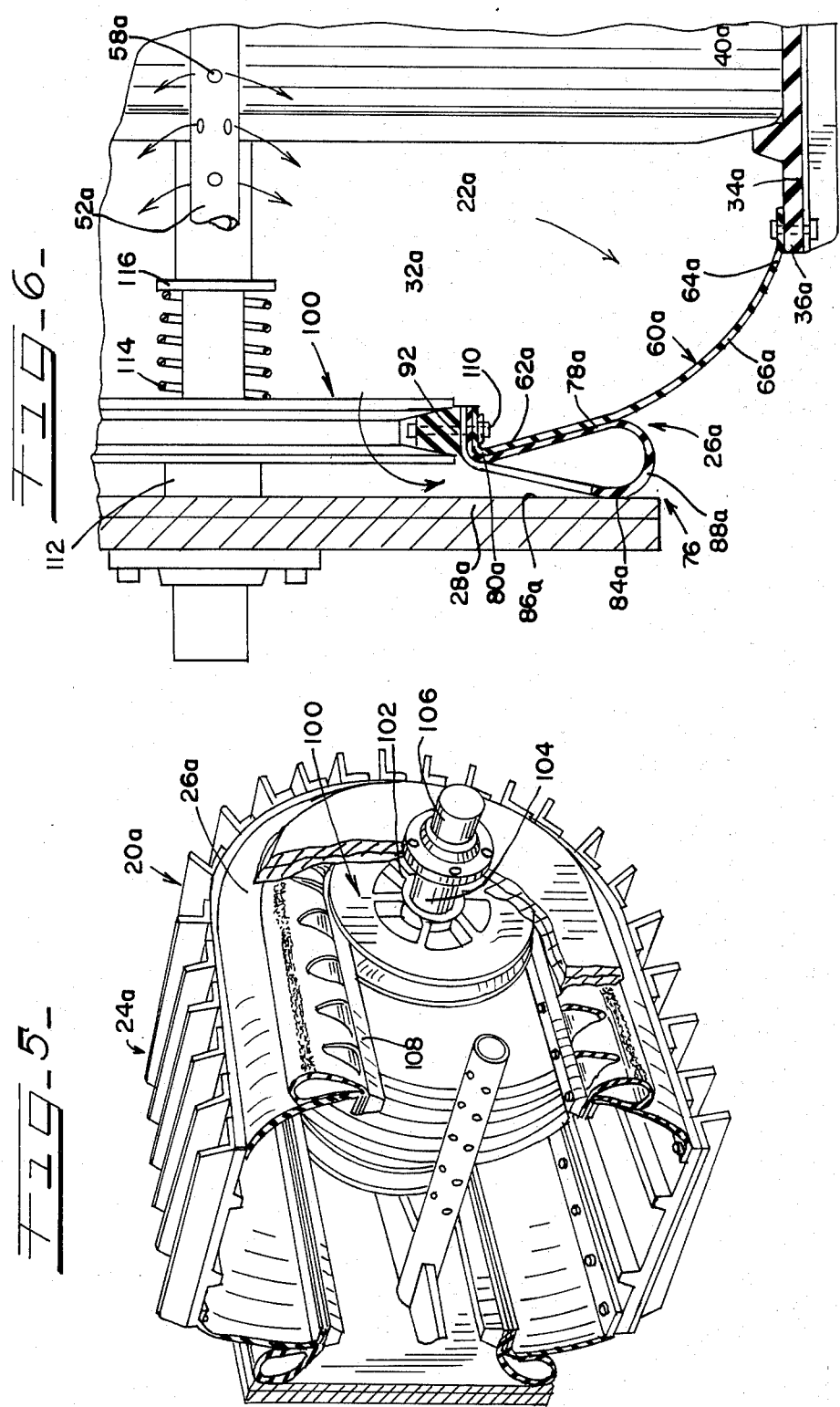

DYNAMIC SEALS FOR VEHICLE AIR SUSPENSIONS

The present invention relates generally to vehicle suspension systems, and more particularly, to a support assembly used as a part of a vehicle suspension and advantageously combining certain features of conventional crawler tractors and air cushion or extra low pressure, pneumatically supported vehicles.

It has long been appreciated that there is room for improvement in vehicles able to traverse loose, uncompacted soil, including marshy or swampy soil. There are land areas which it is possible to traverse with existing equipment, but which are nevertheless susceptible to more damage than is necessary or acceptable from an ecological standpoint when traversed by known industrial or agricultural equipment, including conventional crawler tractors.

Conventional crawler tractors by reason of spreading the load across the track which comes in contact with the travelled surface, are able to be supported on loose, marshy soil and able to develop good, tractive effort through the distribution of weight and low pressure as well as the use of traction enhancing devices, such as grouser plates positioned on the track.

However, known track vehicles commonly apply a pressure which, while low relative to that provided by certain wheeled vehicles, is still much higher than is desirable. According to the present invention, a suspension or support system is provided wherein a pair of drive wheels having a given size, width and front to rear axle spacing are connected by an endless, air-impermeable belt of substantial width. The belt is trained over the wheels and is urged into contact with the earth's surface with a light but constant pressure maintained in an enclosed support assembly filled with air at low but positive pressure.

While this approach, namely, the use of air acting through a track to apply a very low pressure to the travel surface for increased flotation, traction, and decreased ecological damages has been known and suggested in theory, there have been drawbacks associated with the implementation of this idea to date. The general idea of filling an enclosed chamber forming a part of a track with air has been achieved in some cases, including the cases described and claimed in U.S. Pat. No. 4,283,094.

However, as a result of research in vehicles of this kind, it has been determined that there is still room for improvement in this area, particularly improvements in the area of dynamic seals for such vehicles. Ideally, a dynamic seal would provide for minimal loss of air so as to require minimal power in use, would be self cleaning and would be self centering and stabling so as not to require precise mechanical positioning. Under these circumstances, the stability and practicality of the seal would be greatly enhanced.

As yet, the prior art has failed to provide a seal which is satisfactory in all instances and which may be applied to vehicles of the type wherein an imperforate track is trained over two or more spaced apart wheels and urged to the ground by the pressure contained in an enclosed housing or support unit.

It is therefore an object of the present invention to provide an apparatus of this type having an improved construction and arrangement of parts.

A further object of the invention is to provide a vehicle air suspension system which includes a novel arrangement of side plates and seals using air under pressure to provide the suspension force for the track and also to effect the seal.

A still further object of the invention is to provide a seal system which includes a diaphragm and a primary seal unit, with the primary seal unit including an end face seal portion adapted to be urged in substantially air tight seal relation to an associated end plate, and to be positioned for movement along a path parallel to the vehicle track path by reason of having certain elements of the seal supported along a common margin for travel parallel to the travel path of the track.

Another object of the invention is to provide a seal arrangement wherein an endless track includes a pair of diaphragm units extending radially inwardly from its margins, wherein each diaphragm includes a primary seal affixed to it, and wherein means is provided for causing the inner common edge of the primary seal and the diaphragm inner margin to travel a predetermined path while a portion of the primary seal is urged into end face sealing relationship to an associated end plate.

Another object of the invention is to provide a seal assembly wherein a primary seal and a diaphragm seal have their common inner margins confined to a desired movement path by a plurality of individuals fingers extending radially inwardly from a track forming a part of the apparatus.

In another aspect, it is an object of the invention to provide an apparatus of the foregoing kind wherein the movement path of the common inner margin of the diaphragm unit and the primary seal unit are moved along a common travel path by reason of being affixed to a belt trained over pulleys arranged co-axially with the drive wheels of the unit.

The foregoing and other advantages and objects of the invention are achieved in practice by providing a vehicle support assembly which includes a track trained over a pair of wheels and adapted to follow a given movement path in use, a pair of end plates extending beyond the axles and each including an inner end face sealing surface, and a composite seal which includes a diaphragm and a primary seal having an end face surface on it which mates with the end plate surface, and wherein the primary seal contains means for urging the seal surface to follow a desired travel path parallel to the path followed by the track.

The exact manner in which these and other objects and advantages of the invention are achieved in practice will become more clearly apparent when reference is made to the following detailed description of the preferred embodiments of the invention set forth by way of example and shown in the accompanying drawings wherein like reference numbers indicate corresponding parts throughout.

BRIEF DESCRIPTION OF THE DRAWINGS

FIG. 1 is a fragmentary perspective view, showing certain constructional details of the vehicle suspension system of the invention;

FIG. 2 is a side elevational view, with portions broken away, showing the vehicle track, the side plates, and certain details of the seal unit of the invention;

FIG. 3 is a vertical sectional view, taken along lines 3—3 of FIG. 2, and showing certain details of the interior of the vehicle support assembly of the invention;

FIG. 4 is an enlarged fragmentary vertical sectional view, with a portion shown in exploded relation of certain details of the end face seal provided by the invention;

FIG. 5 is a fragmentary perspective view of another form of seal assembly incorporating the principles of the invention; and FIG. 6 is a fragmentary enlarged vertical sectional view showing principal elements of the seal system and vehicle support assembly of FIG. 5.

DESCRIPTION OF THE PREFERRED EMBODIMENTS OF THE INVENTION

While it will be understood that the invention may be carried into practice in different ways and is not intended to be limited to the forms illustrated herein, forms of the invention are illustrated wherein the application is a trailer or the like and wherein the vehicle suspension system includes a plurality of units, each having two spaced apart wheel units and wherein the track extends between these units in a front to rear sense as well as outwardly to either side thereof. The application illustrated is advantageously used as an agricultural tractor or vehicle for traversing unstable soil including swamp marsh and, in some cases, water.

While the invention has a number of novel features, a principle novelty of the invention is the arrangement of a composite seal in which a pair of flexible elements, one a diaphragm and the other a tubular seal body, are arranged with their inner margins affixed so as to follow a common movement path parallel to that of the track and wherein the tube seal unit is an end face seal having a construction and arrangement of parts which enables its sidewall to form a seal with the plate covering one portion of the vehicle support unit, and arranged so that the inner edge may follow both a straight movement path as in the case of its upper and lower runs and a curved movement path at the end of each run where the track is trained over the wheel units.

In one embodiment, the inner common margin of the diaphragm and the primary or tube seal body are carried by a plurality of fingers which extend inwardly from the vehicle track, and in the other case, this common inner margin is carried by a belt and pulley arrangement so as to replicate the travel path of the track and the remainder of the seal elements.

Referring now to the drawings in greater detail, FIG. 1 shows the invention to be embodied in a vehicle generally designated 10 having a body generally designated 12 to which are affixed a pair of axles 14, 16. A typical axle such as the axle 16 has an end portion 18 which is disposed within a vehicle support assembly generally designated 20.

The support assembly 20 carries within it a pair of substantially identical wheels generally designated 22 (only one shown in FIG. 1) and two other major subassemblies, namely, a track assembly generally designated 24 and the seal assembly generally designated 26.

The support assembly 20 is shown in FIGS. 1-3 to include a pair of substantially identical side plates generally designated 28, 30. As will appear, the track and seal assemblies 24, 26 are positioned for movement relative to the end plates 28 and 30, with the seal assembly ensuring that a low, but positive air pressure may be maintained in the interior portions 32 of the support assembly. This is done generally by the construction and arrangement of the seal assemblies 26 so that the sealing surface of one of its components follows a travel path generally parallel to that of the track while such sealing surface is being urged by the air pressure in the support assembly interior 32 into end face sealing relation with a counterpart, opposed sealing surface on its associated end plate. The remainder of the seal elements and the track are permanantly sealed to each other in airtight relation, but as will appear, air entry openings necessary for exposure to the air pressure and the support assembly interior are provided.

Referring again to FIGS. 1-3, the track assembly 24 includes a continuous, air-impermeable belt 34 having opposite margins 36, 38 and a center section 40 lying therebetween. A plurality of grouser plates 42 may be affixed in a known manner to the outer surface of the track to provide increased mechanical contact with the substrate over which the vehicle is intended to pass.

As best shown in FIG. 3, the inside surface 44 of the belt 34 engages a driving surface 46 of the wheels 22. Alignment is aided by provision of guide ribs 48, 50 on the inner surface of the belt 34.

Referring again to FIGS. 1 and 3, it is shown that an air supply tube 52 is affixed to the side plate 28 by a bracket 54 and that the tube 52 extends through an opening 56 in the side plate 28. A plurality of passages 58 allow air to flow from the supply into the interior 32 of the support assembly 20.

Referring now to the seal assembly 26, this unit in turn, includes a number of elements including a diaphragm generally designated 60, which includes an inner margin 62, an outer margin 64, and an imperforate airtight side wall surface 66. Means in the form of diaphragm support fingers generally designated 68 are provided and shown to include flanges 70, for attachment to the margins 36 of the belt 34, inner end portions 72 and center sections 74.

In addition, the seal assembly 26 includes an elongated, inflatable primary seal unit generally designated 76 and shown to include, as best seen in FIG. 4, an inner seal body sidewall 78 having a continuous inner margin 80, an outer seal body sidewall 82 having an end face outer sealing surface 84 adapted to engage a counterpart sealing surface 86 on an inwardly directed portion of an end plate 28. The outer sealing surface 84 is joined to the outer margin of the inner sidewall surface 78 by an imperforate seal body end portion 88.

As best shown in FIGS. 2 and 4, the portion of the outer seal body sidewall 82 lying radially inwardly of the sealing surface 84 includes a plurality of spaced apart webs 90 having inner margins 92 adapted to receive fasteners 94, and arranged such that a plurality of air entry openings 96 are provided between portions of the webs.

Referring again to FIG. 4, it will be noted that by reason of the fastener 94 and the arrangement of the inner and outer seal body sidewalls 78, 82, and the inner margin 62 of the diaphragm 60, there is a common inner seal margin 98, whose travel path is determined by the diaphragm support fingers 68.

Referring for the moment to FIGS. 2, 3, and 4, the operation of the seal assembly may be appreciated. Here, the interior 32 of the seal assembly 26 is inflated by a passage of low pressure air, such as air at one to five p.s.i. from a suitable source of compressed air. This creates an outward force on all of the suspension components, supporting them from within. The diaphragm 60 tends to bow somewhat outwardly, but the support fingers 68 provide some resistance to laterally outward movement of the diaphragm 60, the movement which is permitted, however, is resisted by the novel primary tubular seal of the invention. This unit, which may be thought of as analogous to a elongated automobile tire, contains a plurality of webs on one of its sidewalls which are spaced apart by air inlet openings. Hence, the interior of this seal is subjected to air pressure which urges outwardly in all directions. Since both inner margins of the primary seal 80 and the inner margin of the diaphragm 62 are carried on a common finger or equivalent support, the primary seal 76 will follow a travel path generally parallel to that of the track belt 34. Similarly, the end face seal surface 84 on the primary outer seal body sidewall 82 will follow a parallel path intermediate the paths defined by the common inner margin 98 and the track 24. The end faces urged against the cooperating seal surface 86 on the side plate 28, but since the primary seal 76 is confined against radial expansion, it is urged into sealing relation by the interior air pressure.

There is an extremely slight but measurable air leakage between the opposed seal surfaces 84 and 86, but that this leakage has extremely minimal power requirement and moreover, is advantageous in that it keeps the seal surface free from build-up of sand, dirt and foreign matter and thus constitutes an advantage of the sealing arrangement.

While the common inner seal margin 98 of the diaphragm 60 and the primary seal 76 may distort somewhat as by wrinkling, when the affected portions of the seal pass around the axles 14, 16 at the end of the support assembly 20, they are sealed together as by bonding or the like. The outer seal body sidewall 82, carrying the outer sealing surface 84, is prevented from possible wrinkling or distortion by the webs 90 which, by reason of the air entry spaces between them, may approach and depart from each other as the seal follows a curvilinear travel path. Apparatus made in accordance with the invention have shown that a track may be supported in such a way that travel over swampy, uncompacted ground, mud, and even water is possible without loss of tractive effort. The power required to maintain inflation of the seal assembly is small relative to the propulsive power required for the apparatus as a whole.

In the form shown, it is assumed that one or more of the wheel units may provide tractive effort for the machine, but the number of support units provide per vehicle, and the number containing drive wheels is optional with the designer. Within any one support assembly, more than two wheels may be provided and any number of these wheels may be powered as may be indicated by other design requirements.

Referring now to another embodiment of the invention, FIGS. 5 and 6 show two additional aspects, one being the floating or spring urged position of the means for carrying the common inner edge of the primary seal and the diaphragm unit and the other shows a different arrangement for carying this common edge.

Referring now to FIGS. 5 and 6, it will be noted that an assembly generally designated 20a and similar to its counterpart in FIG. 1 is shown. This unit includes a track assembly generally designated 24a and a seal assembly generally designated 26a. A side plate 28a is shown, and the support assembly 20a includes an interior space 32a which is kept inflated by air moving through passages 58a in an air tube 52a. The wheels 22a and the details of the track assembly, including the continuous belt 34a having the margins 36a and the center section 40a are the same as those in their counterparts in the earlier figures. Likewise, the diaphragm 60a includes inner and outer margins 62a, 64a and the imperforate sidewall surface 66a. The primary seal unit generally designated 76a also includes the webs 90a, the closed end portion 88a, and the outer end face sealing surface 84a which engages the sealing surface 86a and the side plate 28a. The inner seal body side wall 78a also has its inner margin 80a affixed so as to form a common inner margin with that of the diaphragm 60a and the inner margins 92a of the webs 90a.

However, in the case of the embodiment of FIG. 6, the means for establishing the travel path of the common inner margin includes a pair of substantially identical idler pulleys (only one pulley 100 shown in FIG. 5) each having a center section 102 journaled over an end portion 104 of an axle 106. A V-belt 108 extends between pulleys 100 and a plurality of fasteners 110 may be used to secure the common inner margin 98a to the pulley. A drive arrangement, such as a spline (not shown) or the like may be provided to insure that the pullies rotate synchronously with the wheels, and that the common inner margin 98a is positively carried or drawn along rather than merely following the track.

As shown in FIG. 6, a tubular, cylindrical spacer 112 lies between the center section 102 of the pulley 100 and the inner surface of the side plate 28a; the pulley is urged by the force of the coil spring 114 acting against a fixed shoulder 116 to insure proper alignment of the common inner margin 98a and the proper tensioning of diaphragm 60a.

In operation, the unit works similarly to that of its counterpart shown in FIGS. 1-4. In other words, the primary seal 76a is inflated by air extending through the inlets spaced apart by the webs 90a on the inner margin of the outer seal sidewall 92a; the primary seal surface 84a in its counterpart surface 86a are aligned according to the travel path dictated by the arrangement of the belt 108 and the pulleys 100.

An advantage of this form of the invention is that the forces supporting the common inner margin 98a to position it inwardly of both the primary seal sidewall travel path and the travel path of the track itself acts in tension rather than in compression as is the case with the fingers. It is anticipated, however, that other means of achieving this result may also occur to those skilled in the art and may be used in place of the arrangement shown.

It will thus be seen that the present invention provides improved dynamic seals for vehicle air suspensions having a number of novel advantages and characteristics, including those referred to specifically herein and others which are inherent in the invention. Various preferred forms of dynamic seals of the invention having been described, by way of example, it is anticipated that variations in the described forms of construction may occur to those skilled in the art, and that such variations may be made without departing from the spirit of the invention or the scope of the appended claims.

I claim:

1. A vehicle suspension assembly comprising, in combination, at least two axles each having exterior portions adapted to be carried by parts of a vehicle body and interior portions adapted to lie within a sealed, air containing support assembly, said axles being spaced apart in front to rear relation, a wheel unit carried by each of said axles, said sealed support assembly including a pair of side plates, a track unit and a seal assembly, each of said side plates being supported in substantially airtight relation to said axle, each of said side plates having a given height and front and rear end portions extending respectively forwardly of said front axle and rearwardly of said rear axle, each of said side plates also including a smooth primary sealing surface facing the interior of said support assembly, at least one of said side plates having a passage therein for connection to a pressurized air supply, said track unit including an endless, air impermeable support track having opposed side margins and a center tread portion lying therebetween, said track having portions which are in contact with and trained over portions of said wheel units and positioned thereby so as to have a movement path defined by upper and lower run portions joined by rounded end portions, said seal assembly including a pair of air impermeable sealing diaphragms, each having inner and outer margins with the outer diaphragm margins being joined to said track side margins in airtight relation, an elongated inflatable primary seal unit with a body of tubular cross section, said seal body having a pair of inner margins, a pair of opposed sidewalls joined at their outer margins by an imperforate seal body end portion, one of said seal body sidewalls being imperforate and attached at its inner sidewall margin to said inner diaphragm margin in air tight relation and the other seal body sidewall having its outer margin forming a sealing surface which is disposed in substantially airtight opposed end face sliding sealing relation to said end plate sealing surface, said other seal body sidewall having its inner sidewall margin comprised of spaced apart webs having air entry openings therebetween, said webs having their inner margins affixed to both said one inner sidewall margin and said diaphragm inner margin, thereby forming a common inner diaphragm and seal margin, and means for supporting said common inner diaphragm and seal margin for movement along a path lying generally parallel to and spaced inwardly apart from the travel path of said track unit, whereby said sealing surface on said primary seal body will also follow a travel path parallel to the travel path of said track unit.

2. A vehicle suspension assembly as defined in claim 1 wherein said means for supporting said common inner diaphragm and seal margin comprises a plurality of radially inwardly extending fingers their inner ends associated with said common inner diaphragm and seal margin and their outer ends respectively attached to said side margins of said support track.

3. A vehicle suspension assembly as defined in claim 1 wherein said means for supporting said common inner diaphragm and seal margin comprises a belt and pulley arrangement having at least two pulleys, each of said pulleys being arranged coaxially of its associated wheel and said belt being trained over said pulleys, said common margin being affixed to said belt for travel along a path parallel to the travel path of said belt.

4. A vehicle suspension assembly as defined in claim 3 wherein said at least one of said pulley and one of said wheels have cooperating means providing a positive drive for said pulley, whereby said pulley and said associated drive wheel revolve at the same rotational rate.

5. An apparatus as defined in claim 1 wherein said track further includes a plurality of grouser plates disposed on its outer surface to provide increased tractive effort over the travelled surface.

6. A vehicle suspension assembly as defined in claim 1 where at least one of said axles is an axle having a means associated therewith for providing positive driving effort to said wheels.

7. A vehicle suspension assembly as defined in claim 1 where said support track includes, on its inner surface, means spaced inwardly of its outer margins for guiding said track by engagement with said wheels, said track thereby having a center portion running over and guided by said wheels and two outer margins extending outwardly from said wheel and for support by the air within said support assembly.

8. In combination, a vehicle body portion and at least four vehicle support assemblies, wherein each of said assemblies is an assembly as defined in claim 1, and wherein at least two of said assemblies each include means for supplying positive driving effort to said wheels forming parts respectively of said support assemblies.

* * * * *